United States Patent [19]

Pratscher et al.

[11] Patent Number: 4,741,121
[45] Date of Patent: May 3, 1988

[54] GAS CHAMBER ANIMAL TRAP

[75] Inventors: Andrew J. Pratscher, 267 Cornell, Calumet City, Ill. 60409; Philip J. Andres, IV, Wheaton, Ill.

[73] Assignee: Andrew J. Pratscher, Calumet City, Ill.

[21] Appl. No.: 839,082

[22] Filed: Mar. 13, 1986

[51] Int. Cl.⁴ ............................................. A01M 23/04
[52] U.S. Cl. ............................................. 43/58; 43/74; 43/64
[58] Field of Search ..................... 43/58, 61, 64, 70, 73, 43/74

[56] References Cited

U.S. PATENT DOCUMENTS

| | | | |
|---|---|---|---|
| 550,147 | 11/1895 | Wells | 43/73 |
| 1,020,690 | 3/1912 | Frey | 43/73 |
| 2,312,209 | 2/1943 | Colwell | 43/74 |
| 2,594,182 | 4/1952 | Kness | 43/74 |
| 2,608,021 | 8/1952 | McKim | 43/70 |
| 2,643,480 | 6/1953 | Jones | 43/61 |
| 4,253,264 | 3/1981 | Souza | 43/73 |
| 4,566,218 | 1/1986 | Kurosawa | 43/58 |
| 4,596,087 | 6/1986 | Pratscher | 43/64 |

Primary Examiner—Kurt Rowan
Attorney, Agent, or Firm—Thomas W. Tolpin

[57] ABSTRACT

A compact industrial animal trap is provided with a gas injector to effectively, continually and rapidly exterminate rodents and other animal pests with carbon dioxide or other gases in a reliable, efficient and safe manner. The animal trap has a disposal chamber and an elongated entrance chamber. In the preferred form, the entrance chamber has a vertically pivotable floor to lift and carry the animal from the entrance chamber into the disposal chamber.

11 Claims, 4 Drawing Sheets

GAS CHAMBER ANIMAL TRAP

BACKGROUND OF THE INVENTION

This invention pertains to industrial animal traps, and more particularly, to devices for killing rodents and other animal pests.

In the farming, harvesting, and storing of food grains, it has been estimated that as much as 30% of the food products are lost to rodents (rats, mice, etc.) whether the food be in the field, in a silo, or in transportation. The worldwide loss due to rodent consumption has been estimated to run into billions of dollars.

In the past, control of rodents and other animal pests have been usually confined to chemical pesticides. Chemical pesticides, however, are not usually effective to efficiently eliminate aand dispose of large numbers of rodents without contaminating or otherwise adversely effecting the soil, atmosphere, and other areas of the environment.

Spring-loaded animal traps and other devices for entrapping and killing rodents and other animal pests have been known for centuries. Typifying these traps are those shown in U.S. Pat. Nos. 114,062; 214,013; 363,554; 813,333; 829,960; 857,879; 1,002,082; 1,120,114; 1,436,272; 2,061,123; 2,273,008; 2,531,568; 4,145,834; 4,154,016; 4,238,903; 4,253,264; 4,255,891 and 4,450,648 and German Pat. No. 532,206. These traps have met with varying degrees of success.

Many of these prior art traps, however, suffer from the disadvantage that large numbers of rodents cannot be killed since the traps must be manually reset after each kill. Furthermore, many of these traps are complex, cumbersome, bulky, and ineffective.

It is therefore desirable to provide an improved animal trap which overcomes most, if not all, of the above problems.

SUMMARY OF THE INVENTION

An improved animal trap is provided which effectively destroys vast numbers of rodents (rats, mice, etc.), pigeons, crows, and other animal pest in a safe manner. Desirably, the novel animal trap can automatically and efficiently kill thousands of rats or other animal pests with little or no maintenance and repair.

The animal trap is quick, virtually bloodless, and economical. It can eliminate rodents and many other types of undesirable animals without dangerous and hazardous chemical pesticides.

It can be pneumatically, mechanically, or magnetically operated or powered by solar energy or electricity, if desired. The trap can be activated by pressure-sensitive whisker switches or by other triggering means. The sequence of operation of the trap can be controlled by a pneumatic logic board, electromagnetic relays, electric circuit boards or chips, and/or mechanical timing mechanisms, such as cams, toggles, geneva wheels, gears, etc.

Desirably, the automatic animal trap is compact, dependable and effective. To this end, the animal trap has an entrance chamber with moveable doors, floor and an optional overhead flap which automatically and sequentially operate, when a rodent or other animal enters the trap and trips a detector or sensor, such as a pressure-sensitive trigger switch (pressure-sensitive whiskers or feeler switches). Other types of detectors (sensors), such as photoelectric switches, can also be used. The animals are attracted into the entrance chamber by the odor, scent, and aroma of bait from an adjacent bait source which can permeate and pass into the entrance chamber through a screen, conduit, or other openings.

The animal can enter the trap through an access opening and passageway at either end of the entrance chamber. After the animal enters the entrance chamber and trips the detector (sensor), the entrance doors are automatically closed, by power-driven pistons or plungers and auxiliary springs to prevent the animal from leaving the entrance chamber. Thereafter, the overhead flap is pivoted to its open position and the floor is pivoted upwardly by power-driven pistons or plungers and auxiliary springs to lift and discharge the animal into a discharge chamber positioned along side of the entrance chamber. A gas, such as carbon dioxide, is injected into the animal trap to displace the air and kill the animal. The gas can be injected into the discharge chamber and/or the entrance chamber after the doors are closed. Gas injection can occur prior to, concurrently, or after the floor pivots. In the illustrative embodiment, the gas is injected into a removable tray in the discharge chamber after the floor has pivoted upwardly and the animal has been discharged into the discharge chamber.

Preferably, the gas injector and the pistons are all connected to a liquified carbon dioxide tank. Carbon dioxide is safe, inexpensive and readily abundant. Significantly, carbon dioxide is also noncombustible and used in fire extinguishers. This is particularly important from a safety standpoint in commercial food operations, such as grain elevators, where electrical traps and equipment cannot be used by local regulations, since electric sparks may cause an explosion.

In the preferred form, the entrance and discharge chambers (compartments) are in side-by side, general horizontal alignment and/or lateral registration with each other for mechanical simplicity and stability. Such construction is more attractive to many animals who are too lazy to walk up a ramp or otherwise climb up to the top chamber of a vertical trap. It also substantially reduces the overall height of the trap which is useful in places with limited height requirements.

The discharge chamber preferably has a removable tray or slidable detachable drawer and can be at a slight incline or pitch, if desired. The reliable trap is also elongated and compact so it can be placed along a wall where rodents prefer to travel.

A more detailed explanation of the invention is provided in the following description and appended claims taken in conjunction with the accompanying drawings.

DETAILED DESCRIPTION OF THE PREFERRED EMBODIMENT

Referring now to FIGS. 1-7 of the drawings, a compact horizontal, gas chamber animal trap 10 provides an industrial animal killing device for killing rodents (rats, mice, etc.), pigeons, crows, rabbits, raccoons, and other animals. While the animal trap is described with particular reference to rodents, it is to be understood that the animal trap can also be used for attracting, trapping, killing, and disposing of other animals.

The animal trap 10 has a housing 12. The housing has parallel rectangular end walls 14 and 16 and elongated parallel rectangular sidewalls 18 and 20 which extend between and connect the end walls at right angles. The sidewalls provide the front 18 and back 20 of the trap. The top of the housing comprises a rectangular cover or lid 22 which is pivotally connected to the back of the housing by one or more hinges 24. The front and sides of the cover have a downwardly depending lip or flange 26. The bottom of the housing comprises a horizontal rectangular base 28 (FIGS. 4-7) which extends between and connects the sidewalls and end walls. The top, bottom, and walls of the housing are generally planar or flat. The parts and components of the trap are made of metal, such as aluminum, or impact-resistant plastic. It is preferred that the exterior surface of the housing be of a non-reflective color, such as flat gray, to minimize the reflection of light which might scare the animal.

Each of the end walls has an n-shaped access entrance opening 30 or 32 which provide rat holes through which rats and other animals can enter the trap. The openings are positioned adjacent the back and bottom of the housing. The openings are in alignment with each other and are of the same size.

The animal trap has an elongated tunnel-like entrance chamber or compartment 34 which provides a feeding chamber, into which the animal is attracted and enters, and a disposal or discharge compartment 36 which provides a gas chamber (gaseous killing chamber) in which the animal is killed.

The rectangular-shaped entrance and disposal chambers or compartments are in side-by-side horizontal and lateral alignment, communication and registration with each other so that the rodent or other animal does not need to walk up a ramp or otherwise climb up the trap before entering the access opening of the feeding chamber. It has been found that the horizontal animal trap is more efficient and effective in killing rodents and other animals than a vertical trap.

The entrance and disposal compartments have a common horizontal ceiling 38 (FIGS. 5-7) which is spaced below the top (cover) of the housing and provids a generally planar or flat support platform. The ceiling cooperates with the top of the housing to provide an upper storage compartment 40 for supporting, storing and mounting a tank 42 containing liquified carbon dioxide at about 800 psi, a tank 44 containing gaseous carbon dioxide at about 20 psi, a pneumatic logic control board 46, and a counter 48. The tanks and logic control boards are connected to each other by hoses or lines 50-53. The flow of carbon dioxide from the tanks are regulated and controlled by control valves 56 and 58.

The compact animal trap has an elongated U-shaped removable, open top-removable bait box, compartment or tray 60 (FIG. 4) positioned under the floor or along side of the entrance chamber. The bait box compartment is about 10% the size and cross-sectional area of the entrance chamber. The bait box need not be used or can be optionally removed, eliminated, or avoided when it is desired to place or spread the bait, such as cheese or peanut butter, on part of the interior or exterior surface of the entrance chamber, such as along the barrier wall in the disposal chamber. In order to attract the animal into the entrance chamber, the floor or walls of the entrance chamber has bait dispensing means in the form of bait holes, apertures or passageways 62 (FIGS. 3 and 4) through which the aroma, fragrance and scent of the bait can pass. The bait holes are in communication with the bait.

Figure 1:
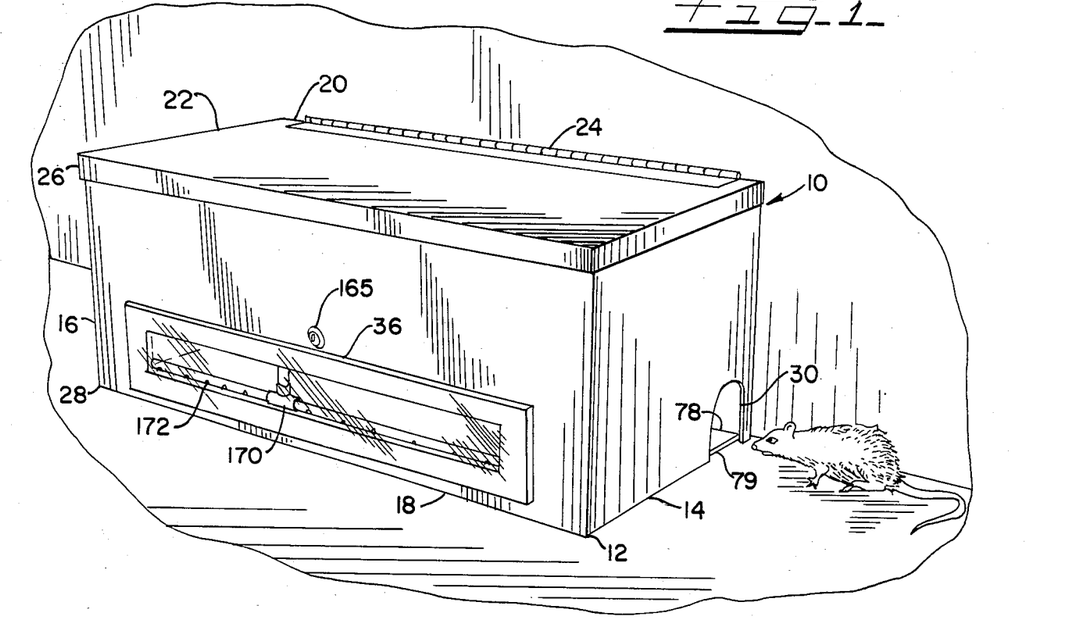
FIG. 1 is a perspective view of a gas chamber animal trap in accordance with principles of the present invention.
Figure 2:
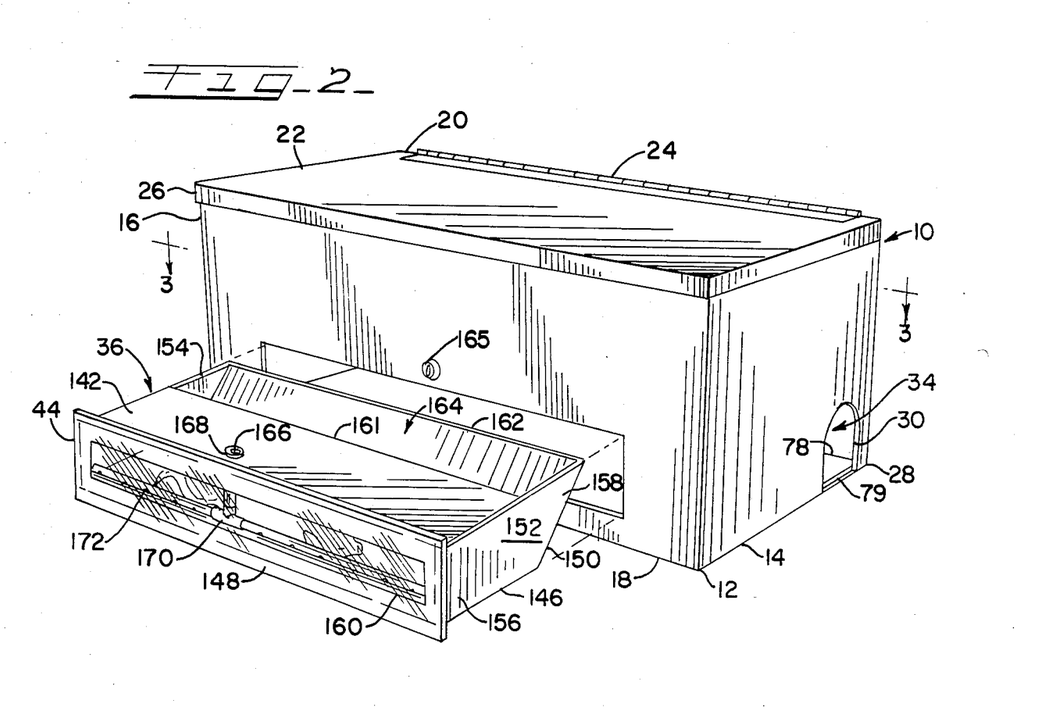
FIG. 2 is a perspective view of the animal trap with part of the disposal chamber removed.
Figure 3:
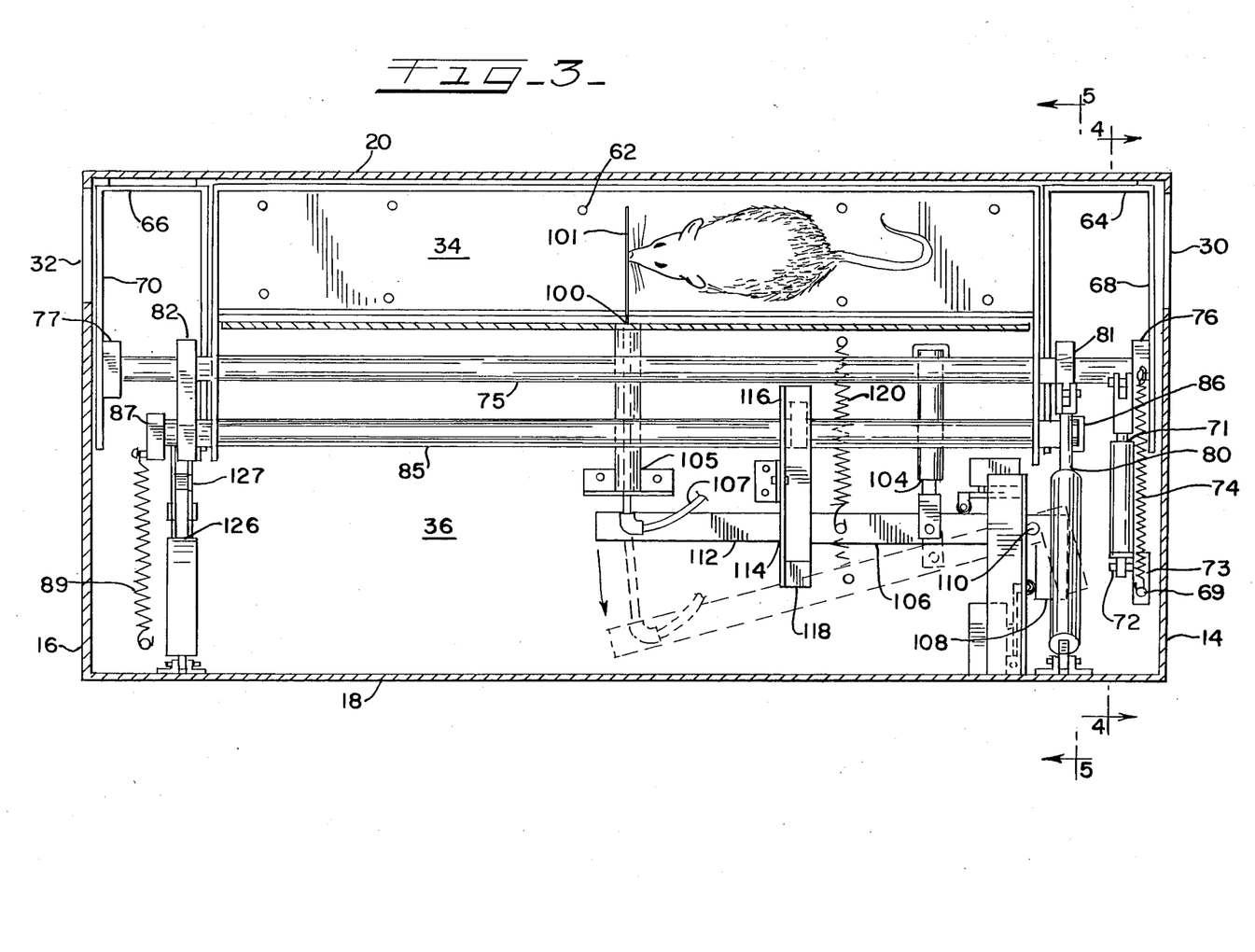
FIG. 3 is a cross-sectional top view of the animal trap taken substantially along lines 3—3 of FIG. 2.
Figure 4:
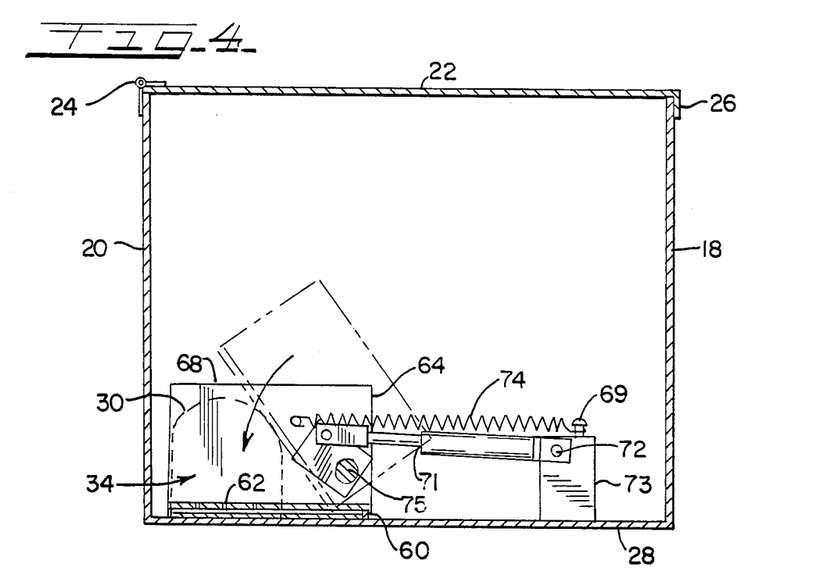
FIG. 4 is a cross-sectional end view of the animal trap taken substantially along lines 4—4 of FIG. 3.
Figure 5:
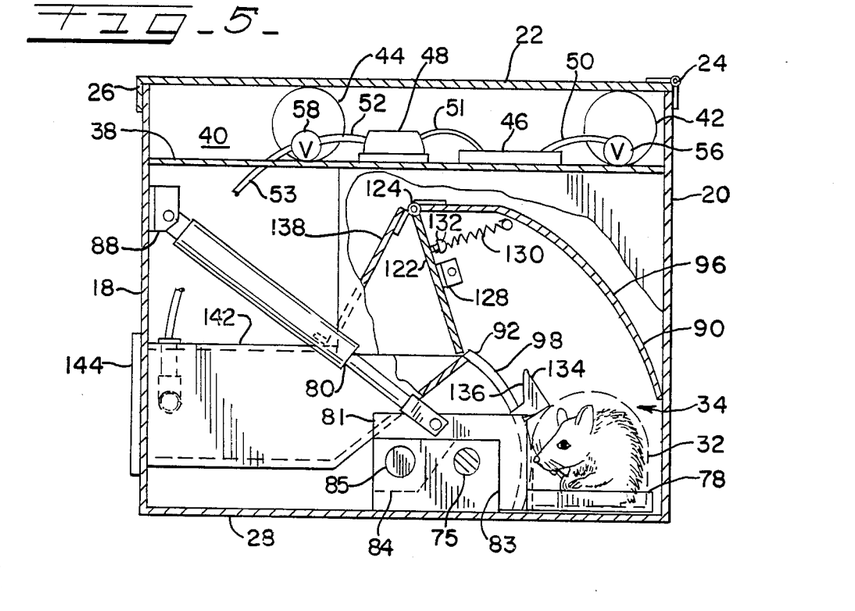
FIG. 5 is a cross-sectional end view of the animal trap taken substantially along lines 5—5 of FIG. 3.
Figure 6:
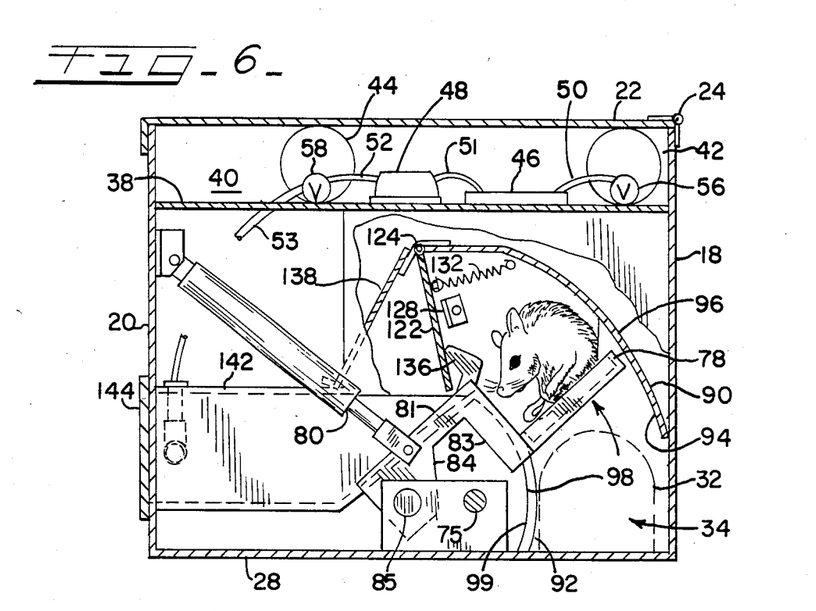
FIG. 6 is a cross-sectional end view of the animal trap with the floor moving towards its upper discharge position.
Figure 7:
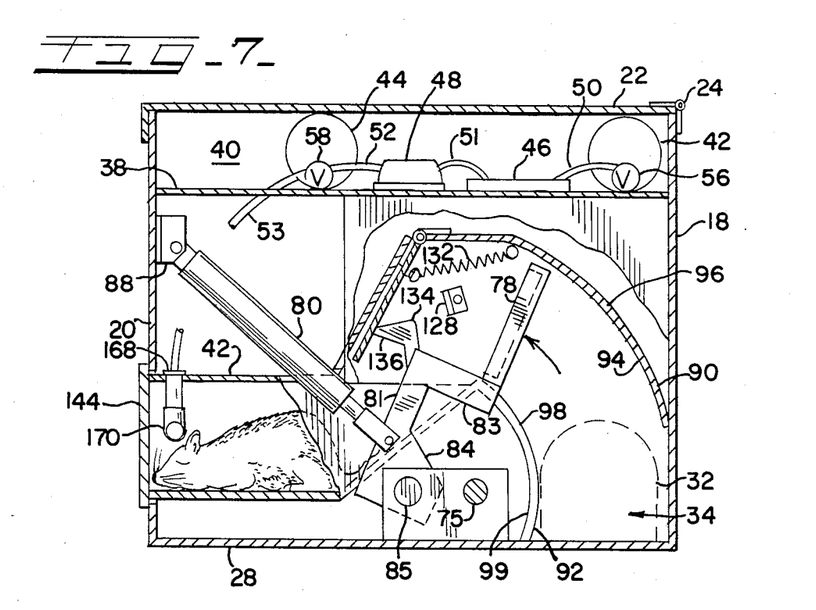
FIG. 7 is a cross-sectional end view of the animal trap after the floor has reached its upper discharge position and the animal has been pushed into the disposal chamber.

The entrance chamber is elongated and provides a tunnel with normally open opposite ends that define access openings 30 and 32 for entrance of an animal. Each of the ends has a vertically moveable, power-driven door 64 or 66 (FIG. 3) which is operable from a normally open position, to permit the animal to enter the entrance chamber, to a substantially closed position which blocks the access opening to prevent the animal from passing through and exiting the access opening. Each door has an inwardly-facing imperforate, rectangular wall or surface 68 or 70 which abuts against and is at least as large as the access opening. The doors are powered by a $CO_2$-powered door-cylinder, piston and rod 71 (FIGS. 3 and 4) which are pivotally connected by a pivot pin 72 to a cylinder-block 73. An auxiliary tension spring 74 can be mounted above the door-cylinder, such as by a block-bolt 69, to urge and bias the doors back to their normally open positon. The doors are connected to each other by a common shaft 75 pivotally mounted on bushings 76 and 77. In the illustrative embodiment, each door is U-shaped as viewed from the top of the trap to provide a double layered (paneled) door. Single layered doors can also be used. A safety control, such as a limit switch, can be operatively connected to the doors to prevent the doors from closing, if an object, such as a child's hand, is positioned in one of the access openings The floor 78 of the entrance chamber has a downwardly extending flange 79 (FIGS. 1 and 2). The floor provides an elevator or push member which is vertically pivoted, radially moved, lifted and driven by a $CO_2$-powered floor-cylinder, piston and rod 80 (FIG. 3) via floor-pivot arms 81 and 82. As shown in FIGS. 5-7, floor-pivot arm 81 has an L-shaped head 83 connected to the floor and a polygonal base 84 connected to a floor shaft 85 which is pivotally mounted on bearings 86 and 87. The floor is pivoted (rotates) and driven by the floor-cylinder from a normally retracted lower position as shown in FIG. 5 providing the base or bottom of the entrance compartment, to a pivoted upward forward discharge position as shown in FIG. 7. In the illustrative embodiment, the floor-cylinder is mounted along side of the door-cylinder and has a mounting flange 88 connected to the front wall of the housing and disposal chamber above the drawer providing the gas chamber. The lower end of the rod of the floor-cylinder and piston is connected to the base 84 of the pivot arm at a location offset and above the floor-shaft 84 (floor pivot point and axis). An auxiliary horizontal tension spring 89 (FIG. 3) can be connected to floor-pivot arm 81 by bolts or mounted below the floor-cylinder to urge and bias the floor (push member) back to its normally retracted position. The floor pivots (rotates) from 45 to 180 degrees, and preferably about 75 degrees, from its lower position to its upper position.

The entrance chamber has stationary radial inner and outer walls 90 and 92 (FIGS. 5-7) which are concentrically positioned about the floor shaft and have a radius of curvature from the pivot point of the floor. The fixed radial walls are curved towards the disposal chamber and provide the sides of the entrance chamber. The outer radial wall has a concave front surface 94 which faces the interior of the entrance chamber and a convex outer back surface 96 which faces the back wall of the housing. The inner radial wall has a convex back surface 98 which faces the interior of the disposal chamber and a concave inner surface 99 which faces the front of the housing. The radial inner wall provides a curved barrier wall or barrier which separates the entrance chamber from the disposal chamber. The radial or transverse span between the radial walls remain the same and are constant as the floor is pivoted radially upwardly.

The central portion of the barrier has a feeler switch-receiving hole or slot 100 (FIG. 3) through which retractable power-driven, laterally moveable, detectors or sensors 102 extend into the intermediate lower central portion of the entrance chamber at a position slightly above the floor. In the illustrative embodiment, the detectors (sensors) are laterally and horizontally moveable from a normally expanded or extended sensing position extending into the entrance compartment to a retracted tripped position within the disposal compartment and out of the way of the pivoting floor. Preferably, the detectors are activating trigger switches or tripable feeler switches which comprise a pair of pressure-sensitive, whisker switches (whiskers) or needle valves which are connected to a $CO_2$-powered sensor- or whisker-cylinder 104, piston and rod, via a sensor-bracket and tube assembly 105 and a sensor-pivot arm 106. When the animal brushes against, touches, or moves the whisker switches (needle valves), the switches (valves) are opened and pressure is released in the whisker-cylinder by hose 107. This will trip and activate the logic control $CO_2$ circuit to move the switches (valves), via the sensor-cylinder and sensor-pivot arm, to their retracted position within the disposal chamber so as not to interfer or be damaged by movement of the elevator floor.

The sensor-pivot arm 106 (FIG. 3) has an L-shaped end 108 adjacent a pivot portion 110 defining the pivot point of the sensor-pivot arm. The pivot portion is pivotally connected by a hinge or bearing to the bottom of the housing. An elongated portion 112 of the pivot arm has a notch 114 for receiving a cammed locking arm or lever 116 with a weighted front portion and tip 118 when the sensors are in their retracted position. An auxialiary tension spring 120 is connected to the pivot arm to urge and bias the sensors to their extended sensing position after the floor has returned to its lower (downward) position and the sensor-cylinder has moved, released and unlocked the sensor-pivot arm from the locking lever.

An overhead swingable, power-driven rectangular flap, door, or panel 122 (FIGS. 5-7) is pivotally connected to the ceiling by one or more hinges 124 at a position above and inwardly of the barrier wall. The panel can be vertically pivoted and driven by a $CO_2$-powered panel-cylinder, piston and rod 126 (FIG. 3) and panel-pivot arm 127, from a normally closed, outer rearward position as shown in FIG. 5 to substantially block the discharge opening so as to prevent premature passage of the animal from the entrance chamber to the disposal chamber as well as back flow of gases from the gas chamber to the entrance chamber, to an open forward and inward position as shown in FIG. 7 to permit passage, discharge, and disposal of the animal from the entrance chamber to the disposal chamber.

An abutment stop or flange 128 (FIG. 5) is mounted on the end wall at a position to limit the outer rearward arc of movement of the panel so that the bottom edge of the panel is positioned closely adjacent the top of the barrier wall in the closed position. An auxialiary tension spring 130 is attached to the back outer surface of the panel, such as by a bolt 132, to urge and bias the panel to its normally closed rearward position.

An L-shaped panel-pivot arm 134 (FIGS. 5-7), which is driven, connected to and pulled by the rod of the panel-cylinder has a triangular head or cam 136 which pushes, abuts against, and drives the panel to its forward open position as shown in FIGS. 6 and 7. The rod is connected to the pivot arm at a location above the bearing defining the pivot point of the panel-pivot arm. A sloping or slanted abutment plate or wall 138 (FIG. 7) is connected to the end wall of the trap and extends at a downward angle of inclination between the pivot hinge 124 of the panel and the back edge of the top 142 of the drawer 144 and limits the forward arc of movement and swing of the panel in its open position. The open position of the panel ranges from 15 to 45 degrees, preferably 20 degrees, relative to a vertical axis. The closed position of the panel ranges from 15 to 45 degrees, preferably 20 degrees, relative to the vertical axis. The range of swing or arc between the open and closed positions of the panel is from 30 to 90 degrees and preferably about 40 degrees for best results.

All the cylinders are operatively connected by pneumatic hoses or tubing 50–53 to each other, as well as to a $CO_2$ supply tanks and the pneumatic, $CO_2$-powered, logic control circuit board, with one or more valves and limit switches. Tripping of the whisker switches (needle valves) will activate the logic control circuit to commence the sequence of operations and the automatic killing and disposal steps of the animal trap. If desired, other power sources, such as batteries, generators, motors, engines, pumps, or solar energy collectors, can be used with other types of cylinders, such as solenoid-activated electromagnetic cylinders, hydraulic cylinders, etc.

The disposal and gaseous killing chamber provides a dischage compartment and bin for killing, disposing and storing the dead animals. In the preferred embodiment, the disposal and gaseous killing chamber 36 (FIG. 2) comprises a removable tray, bin or drawer 144 with generally planar or flat walls including a horizontal rectangular top 142, a horizontal rectangular bottom 146 which extends rearwardly of the top, a vertical rectangular front 148 which extends vertically between and beyond the top and bottom, an inclined slanted back 150 which extends upwardly from the back edge of the bottom at an obtuse angle of inclination of 105 to 175 degrees, preferably about 150 degrees, to provide an inclined ramp and discharge chute, and polygonal sides 152 and 154. Each of the polygonal sides has a rectangular front portion 156 connected to the front and inverted triangular rear portion 158 connected to the back. The front can have an optional window 160. The back edge 161 of the top 142 is spaced forwardly of the rearward top edge 162 of the back to provide a rectangular access opening or inlet 164 into the drawer for receiving animals from the elevator floor via the discharge opening. The rearward top edge of the back is positioned adjacent the top of the barrier wall when the drawer is closed, as shown in FIG. 5. The drawer is positioned longitudinally inwardly of the cylinders and springs so as not to interfer with the cylinders and springs. The drawer can be secured in a closed position by a key lock 165.

The middle portion of the top of the drawer has a hole 166 near the front. A slip connector 168, or hose coupling and seal, is mounted in and about the hole. Extending downwardly from the slip connector is an inverted T-shaped gas injector or manifold 170 with a multitude of downwardly facing nozzles or discharge apertures 172 for injecting and dispensing a gas, such as carbon dioxide into the bottom portion of the drawer providing the gas chamber. A hose 53 (FIG. 7) provides an injector inlet line and is detachably connected and extends upwardly from the slip connector. The injector inlet line is connected to and communicates with the tank of gaseous carbon dioxide.

The gas injector is preferably positioned near the front and bottom portion of the gas chamber for best results, but it may be positioned elsewhere in the disposal chamber or entrance chamber, if desired. Gas impervious seals or caulk are placed along seams and corners of the gas chamber to minimize undesired egress and leakage of gas. The gas can comprise any gas which displaces and is heavier than the air and will kill the animal. The gas is injected into the killing chamber through one or more gas holes or passageways in the gas injector and occupies at least the bottom portion of the killing chamber since it is heavier than the air. Desirably, substantially all the air in the killing chamber is replaced by the gas. In the preferred embodiment, carbon dioxide gas is predominantly used in the gas injector to kill the animal as well as to power the cylinders, pistons and rods which move the doors, elevator (floor), overhead panel, and sensors (whisker switches). The carbon dioxide is supplied by the carbon dioxide ($CO_2$) supply tanks, cylinders or cartridges. Nitrogen gas or carbon monoxide can also be used in the gas injector.

A $CO_2$-powered ball indicator, counter and sensor 48 (FIGS. 5–7), or some other type of indicator, can be placed in the upper storage compartment or in or near the drawer to indicate the presence and amount of killed animals in the gaseous killing chamber.

In operation, the animal enters either end of the tunnel-like animal trap, either because of curiosity, or because it is using the tunnel as a passage along the wall, and/or because it is attracted to the aroma and scent of the bait permeating the entrance chamber. As the animal passes (travels) through the intermediate central portion of the entrance chamber, it will contact, trip and trigger the whisker switches. This will activate and energize the logic control circuit and cause the whisker switches to retract and move to their retracted position within the disposal chamber. Simultaneously, the entrance doors will be lowered to their closed position to block the exits (access openings) of the entrance chamber and trap.

Thereafter, the elevator (floor) of the entrance chamber will pivot upwardly to raise, carry, lift, and push the animal towards the elevator's upward position as shown in FIG. 6. Simultaneously, the overhead panel will pivot forwardly to its open discharge position so that the animal will be pushed and discharge by the push member (elevator) through the discharge opening and slide downwardly on the chute into the bottom of the drawer, as shown in FIG. 7, when the elevator has reached its upper discharge position.

After the animal has been discharged into the drawer providing the gas chamber, the gas injector will be activated to inject carbon dioxide into the gas chamber. Since the carbon dioxide is heavier than air, it will displace the air and occupy substantially the entire volume in the gas chamber about the animal. The displaced air escapes and is vented to the atmosphere through the discharge opening or one or more optional overhead vent holes or one-way valves. The carbon dioxide will effectively, efficiently, and relatively painlessly, kill the animal in 15 seconds to 3 minutes, and usually from 30 seconds to 2 minutes. After the animal is killed, the panel will pivot to its closed position, the doors will open, and the whisker switches will move rearwardly to their initial (starting) sensing position to reset the trap for the next animal. Closing of the overhead panel also serves to help retain the carbon dioxide in the gas chamber, which helps minimize the amount of carbon dioxide need to be injected into the gas chamber and prolongs the useful life of the $CO_2$ tanks before refills.

Periodically, the drawer or tray of the discharge chamber should be removed to empty the dead animals into a garbage can, bag or other suitable refuse container. After disposal, the empty drawer or tray should be replaced (reinstalled) in the animal trap.

The compact animal trap has been tested and found to be reliable and effective to rapidly exterminate rodents, such as rats and mice, in a safe and efficient manner. The animal trap can also be used to exterminate other animal pests, such as pigeons, crows, rabbits and raccoons.

The compact horizontal, gas chamber animal trap is effective, efficient and safe. It is less bulky than prior art traps for easier handling and fabrication and more compact for ease of shipment and economy of material. The gas chamber animal trap is specially designed to fit along walls where rodents like to travel and is open at both ends to provide an appealing tunnel-like animal trap so that the rodents can see the exit at the opposite end of the trap with a false sense of security before entering the trap.

While the preferred animal trap has moveable doors for best results, in some circumstances it may be desirable to use a similar animal trap without doors.

Furthermore, while it is preferred to inject carbon dioxide into the discharge chamber to displace and remove the air in the discharge chamber in order to efficiently, safely, and economically kill the animal, in some circumstances it may be desirable to inject other gases into the discharge chamber or withdraw substantially all the air from the discharge chamber by suction or vacuum pressure in order to kill the animal.

Although embodiments of the invention have been shown and described, it is to be understood that various modifications and substitutions, as well as rearrangements of parts, can be made by those skilled in the art without departing from the novel spirit and scope of this invention.

What is claimed is:

1. An animal trap, comprising:

an elongated entrance chamber for attracting an animal, said entrance chamber providing bait-dispensing means for dispensing the aroma of bait and having at least one access opening defining an entrance;

carbon dioxide powered door means in said access opening being moveable from a normally open position for permitting the animal to enter said entrance chamber to a substantially closed position for blocking the access opening to prevent the animal from exiting the access opening;

a discharge chamber for receiving and discharging animals;

a carbon dioxide injector for injecting a sufficient amount of carbon dioxide into one of said chambers to kill said animal after said carbon dioxide powered door means are moved to said closed position;

upper pivotable, carbon dioxide powered panel means separating said entrance chamber from said discharge chamber, said upper carbon dioxide powered panel means being pivotable from a normally closed position for blocking passage of the animal between said entrance chamber and said discharge chamber to an open discharge position for accommodating passage and discharge of the animal from said entrance chamber to said discharge chamber; and said entrance chamber having a carbon dioxide powered, vertically rotatable floor, said carbon dioxide powered floor being rotatable from a downward position providing the base of said entrance chamber to an upper discharge position when said upper pivotable panel means is in said open position for raising and pushing the animal into said discharge chamber.

2. An animal trap in accordance with claim 1 including tripable switch means located in said entrance chamber.

3. An animal trap, comprising:

an elongated entrance compartment providing a feeding chamber with an interior having opposite ends and a ceiling and stationary substantially concentric radial walls extending laterally between and connecting said opposite ends, said radial walls including an outer radial wall with a concave front surface facing toward the interior of the entrance compartment and an inner radial wall with a back convex surface facing toward the interior of the entrance compartment, said inner radial wall providing a barrier extending between and connecting portions of said ends and defining a receiving hole, said outer radial wall arcuately extending and connected to said ceiling, said barrier being spaced from and cooperating with said ceiling to define a discharge opening, each of said opposite ends defining an access opening for entrance of an animal into said entrance compartment, said entrance compartment comprising an elongated tunnel with an intermediate central portion located between said opposite ends adjacent said receiving hole and defining bait passageways for passage of scent of a bait to attract the animal into said entrance compartment;

each of said ends having a vertically moveable, power-driven door operable from a normally open position to permit the animal to enter said entrance compartment to a substantially closed position substantially blocking said access opening to prevent the animal from passing through said access opening;

a disposal compartment defining a gas chamber positioned inwardly of said inner radial wall for receiving animals from said entrance compartment, said inner radial wall separating said entrance and disposal compartments;

an overhead power-driven panel being vertically pivotable from a normally closed position substantially blocking said discharge opening for preventing passage of the animal between the entrance compartment and the disposal compartment to an open position for permitting passage and disposal of the animal from said entrance compartment to said disposal compartment;

said entrance compartment having a vertically pivotable power-driven floor, said floor being radially pivotable from a normally lower position to provide a base of said entrance compartment to an upward forwardly position, when said panel is in said open position, to lift, push, and discharge the animal into said disposal compartment;

at least one tank of carbon dioxide;

an injector operatively connected to and communicating with said tank of carbon dioxide and positioned in said gas chamber for injecting a sufficient amount of carbon dioxide in said gas chamber to kill said animal; and a detector extending through said receiving hole of said intermediate central portion of said entrance compartment compartment and being operatively connected to and triggering the sequential operation of said doors, panel, floor and injector when said animal is detected in said entrance compartment.

4. An animal trap in accordance with claim 3 wherein said detector comprises power-driven pressure-sensitive switches being laterally moveable from a normally expanded position extending into said entrance compartment to a retracted tripped position within said disposal compartment.

5. An animal trap in accordance with claim 4 including power means comprising carbon dioxide-powered pistons operatively connected to and communicating with said tank of carbon dioxide for moving said doors, floor, panel, and switches.

6. An animal trap in accordance with claim 3 including a cammed latch for locking said switches in said retracted position.

7. An animal trap in accordance with claim 3 including a bait box mounted in proximity to said entrance compartment and communicating with said bait passageways.

8. An animal trap in accordance with claim 3 wherein said disposal compartment comprises a removable drawer.

9. An animal trap in accordance with claim 8 wherein said injector comprises a T-shaped injector mounted in said drawer, said T-shaped injector having a plurality of nozzles.

10. An animal trap in accordance with claim 9 including a housing enclosing said entrance compartment and said disposal compartment, said housing having a top, said ceiling extending above said entrance compartment and said disposal compartment, said ceiling positioned below and cooperating with said top of said housing to define a storage compartment therebetween, said tank including one tank of liquefied carbon dioxide and another tank of gaseous carbon dioxide, said tanks being connected and communicating with each other, and said ceiling providing a support platform for supporting said tanks in said storage compartment.

11. An animal trap in accordance with claim 10 including a logic control board mounted on said support platform and operatively connected to said detector, doors, panel, floor, and ceiling, and a counter for indicating the number of animals killed in said gas chamber.

* * * * *